United States Patent [19]

Carter, III

[11] Patent Number: 5,046,784
[45] Date of Patent: Sep. 10, 1991

[54] WHEEL COVER RETENTION SYSTEM

[76] Inventor: George A. Carter, III, 6614 Lakeshore Dr., Garland, Tex. 75042

[21] Appl. No.: 496,339

[22] Filed: Mar. 20, 1990

[51] Int. Cl.⁵ .............................................. B60B 7/06
[52] U.S. Cl. .............................. 301/37 PB; 301/37 R; 301/37 S
[58] Field of Search ............... 301/37 R, 37 P, 37 TP, 301/37 PB, 37 S

[56] References Cited

U.S. PATENT DOCUMENTS

| | | | |
|---|---|---|---|
| 1,993,061 | 3/1935 | Hunt et al. | 301/37 |
| 2,016,395 | 10/1935 | Sinclair | 301/37 S |
| 2,076,789 | 4/1937 | Le Jeune | 301/37 S |
| 2,192,064 | 2/1940 | Pettinati | 301/63 |
| 2,231,183 | 2/1941 | Flandes | 301/37 C X |
| 2,282,222 | 5/1942 | Goeske | 301/37 |
| 2,386,241 | 10/1945 | Lyon | 301/37 C |
| 2,568,430 | 9/1951 | Casabianca | 301/108 |
| 2,621,978 | 12/1952 | Lyon | 301/37 C |
| 2,812,215 | 11/1957 | Waite | 301/37 |
| 2,885,245 | 5/1959 | Lyon | 301/37 C |
| 2,902,316 | 9/1959 | Black | 301/37 |
| 2,935,361 | 5/1960 | Aske | 301/37 |
| 2,973,226 | 2/1961 | Ellies | 301/37 |
| 3,356,421 | 12/1967 | Trevarrow, Jr. | 301/37 |
| 3,481,652 | 12/1969 | Mazerolle | 301/37 |
| 3,528,705 | 9/1970 | Oldroyd | 301/37 |
| 3,724,905 | 4/1973 | Kachler | 301/37 |
| 3,860,295 | 1/1975 | Beisch | 301/37 |
| 4,003,604 | 1/1977 | Connell | 301/37 |
| 4,054,323 | 10/1977 | Lewis | 301/37 |
| 4,229,047 | 10/1980 | Beisch | 301/37 |
| 4,344,654 | 8/1982 | Apezynski | 301/37 |
| 4,388,771 | 6/1983 | Lalonde | 40/587 |
| 4,889,394 | 12/1989 | Ruspa | 301/37 PB |

FOREIGN PATENT DOCUMENTS 1100164 9/1955 France ........................... 301/37 PB

*Primary Examiner*—Russell D. Stormer
*Attorney, Agent, or Firm*—Hubbard, Thurman, Tucker & Harris

[57] ABSTRACT

A decorative wheel cover apparatus is disclosed for relatively inexpensively simulating the appearance of a more expensive custom wheel. The apparatus includes a wheel cover member, having a contoured body and circular inner and outer rims which accurately simulates the appearance of a custom wheel, and a unique retention system for removably securing the wheel cover member to an ordinary automotive wheel. The retention system includes a first portion disposed along the back of the wheel cover member, and a second portion disposed on the wheel directly behind the first portion, with the first and second portions being suited for releasable engagement with one another. Preferably, the first and second portions of the retention system constitute mating rings, the first ring being secured to the outer rim of the wheel cover member and having a plurality of lugs extending therefrom, and the second ring having a plurality of receptacles for receiving and releasably retaining the lugs.

29 Claims, 3 Drawing Sheets

WHEEL COVER RETENTION SYSTEM

BACKGROUND OF THE INVENTION

The present invention relates generally to automotive wheel cover apparatus and, in a preferred embodiment thereof, more particularly provides a simulated custom wheel having a unique retention system for attachment to an ordinary automotive wheel in a manner that allows the simulated wheel to more closely duplicate the appearance of a custom wheel.

A need exists in the automotive industry for a relatively inexpensive wheel cover apparatus which convincingly simulates the appearance of a much more expensive custom wheel. The invention disclosed in my above referenced application provides a unique method and apparatus for simulating the appearance of a custom wheel by employing an inexpensive wheel cover comprising a generally flat annular body portion having a uniquely applied custom wheel pattern painted thereon.

With conventional hubcaps or other types of wheel cover devices, a limitation typically exists in their ability to closely simulate the appearance of a custom wheel. In particular, substantial difficulties have been recognized in creating an inexpensive wheel cover which accurately duplicates the contour of a custom wheel. For the most part, these difficulties stem from the conventional retention systems used to secure the wheel cover device to the automotive wheel.

The most common problem with conventional retention systems is that, for one reason or another, they occupy too much space in a radially inward direction from the outer peripheral edge of the automotive wheel. In order to hide the retention system in a manner simulating a custom wheel, conventional wheel cover devices typically have much wider outer rim portions than do actual custom wheels. The radial bulk of conventional retention systems causes a particular problem when the body portion of the wheel cover device is deeply contoured to more completely simulate a custom wheel. Consequently, wheel covers utilizing conventional retention systems typically do a relatively poor job of simulating both the deep contour and narrow outer rim which are typically characteristic of expensive custom wheels. In fact, the difference in outward appearance between a conventional wheel cover and a custom wheel is quite noticeable, particularly to one skilled in this art.

Conventional retention systems used on hubcaps and wheel covers typically include a series of metallic spring clips which, upon being forced into compression, frictionally engage an inner, radially-facing surface of the automotive wheel. Such spring clip-based retention systems make the hubcap or wheel cover inordinately difficult to install, as well as being susceptible to unintended disengagement and loss. Hubcaps and wheel covers incorporating conventional retention systems are also frequently stolen, since they are typically easy to remove and include no anti-theft features.

Another common problem with conventional retention systems is that they are typically not well suited for use with most conventional wheel balancing weights. The most common type of wheel balancing weight is the clip-on type, which attaches to the outer peripheral edge portion of the wheel. With most conventional wheel cover retention systems, clip-on weights prevent the wheel cover from fitting flush completely around its perimeter, unless the wheel cover includes an unsightly gap to accommodate the weight. Tape-type wheel balancing weights, which may be positioned radially inwardly of the outer peripheral edge of the automotive wheel, provide an acceptable alternative to clip-on wheel weights in some instances, thus solving this problem. Unfortunately, such tape-type wheel weights cannot be used with many conventional retention systems since such retention systems engage the portion of the wheel occupied by the wheel weight, so that removal of the wheel cover would inadvertently result in removal of the weights.

From the foregoing description of conventional apparatus, it can be seen that it would be highly desirable to provide a relatively inexpensive wheel cover device which accurately simulates a more expensive custom wheel. In simulating a custom wheel, it is particularly desirable for an inexpensive wheel cover device to duplicate the deep contour and relatively narrow peripheral edge portion which are characteristics of custom wheels. It would also be highly desirable to provide a retention system which allows the use of ordinary automotive wheels with improved wheel covers which accurately simulate custom wheels. It would be further desirable to provide such a retention system which allows the use of wheel balancing weights without adversely affecting the location of the weights or the outward appearance of the simulated custom wheel. Accordingly, it is an object of the present invention to provide such an improved simulated custom wheel apparatus and retention system.

Additional objects of the present invention are to provide a simulated wheel cover apparatus with an improved retention system which enables the user thereof to easily remove and install the apparatus, while providing a locking feature which significantly reduces the chances of both accidental loss and theft.

SUMMARY OF THE INVENTION

In carrying out principles of the present invention, in accordance with a preferred embodiment thereof, a specially configured plastic wheel cover member is provided which includes a deeply contoured body portion and a relatively narrow outer rim portion, thereby accurately simulating the outward appearance of a custom wheel. This unique wheel cover apparatus, or simulated custom wheel, includes a novel two-part retention system which allows the device to simulate the appearance of a custom wheel to a degree heretofore unknown in the art.

The retention system representing a preferred embodiment of this invention utilizes two mating rings, arranged in concentric relationship, the first of which is attached to the plastic wheel cover member, with the second ring being secured to the automotive wheel. The first ring, which is removably secured to the outer rim portion of the wheel cover member, includes a plurality of T-shaped lugs extending therefrom in an essentially radial direction. The second ring, being permanently attached to the automotive wheel radially inwardly of its outer peripheral edge portion, has a plurality of receptacles configured to receive and engage the lugs extending from the first ring. The configuration of the lugs and receptacles is such that the wheel cover member may be installed by simply placing it in position so that the lugs are inserted into the receptacles, then rotating the wheel cover member slightly in either direction, with removal being effected by equivalent counter-rotation.

In the preferred embodiment disclosed herein, the first ring is secured to the wheel cover member by a plurality of screws passing through the outer rim portion of the wheel cover member and engaging threaded bosses formed in the first ring. A locking feature may then be incorporated into the device simply by providing a series of holes in the second ring aligned with the threaded bosses of the first ring. One or more of the aforementioned screws may then be selected with a suitable length for extending completely through the threaded boss and into the hole on the second ring. This locking technique prevents the unintended counter-rotation and consequent removal of the wheel cover member from the automotive wheel.

In order to insure proper alignment of the wheel cover member with the automotive wheel, the first and second rings may also be equipped with alignment guides. Such alignment guides preferably take the form of a tab extending from the first ring and a corresponding slot in the second ring, wherein the tab must be inserted into the slot before the lugs and receptacles can be properly engaged.

The retention system disclosed herein is especially well adapted for use with tape-type wheel balancing weights, which may be placed directly on the second ring or on a radially inwardly facing surface of the wheel. Both embodiments of the retention system disclosed herein allow for repeated installation and removal of the custom wheel cover without disturbing the placement of the tape-type wheel weight.

The preferred retention system disclosed herein comprises a pair of mating rings primarily so that the simulated custom wheel can be utilized with virtually any ordinary automotive wheel. It is contemplated, however, that the receptacles and lugs could also be integrally formed portions of the automotive wheel and wheel cover member, respectively, without departing from the teachings of the present invention.

With the exception of the locking feature described above, the advantages of providing an inexpensive wheel cover which accurately simulates a custom wheel could be obtained by creating a special automotive wheel which includes receptacles as described herein, used in conjunction with a wheel cover member with mating lugs. However, since some of the cost advantage would be lost by providing such a modified wheel, it is also contemplated that the second ring may be used with an ordinary wheel as described above, while the first ring is replaced by lugs integrally formed with the plastic wheel cover member. Any such combination of receptacles and lugs could conceivably provide a positively locking simulated custom wheel as disclosed herein.

BRIEF DESCRIPTION OF THE DRAWINGS

The novel features which characterize the present invention are defined by the appended claims. The foregoing and other objects and advantages of the present invention will hereinafter appear, and for purposes of illustration, but not of limitation, an exemplary embodiment is shown in the drawings.

FIG. 10 is an enlarged scale fragmentary cross-sectional view taken along line 9—9 of FIG. 1, revealing the automotive wheel and an alternative embodiment of the wheel cover apparatus in its assembled state.

DETAILED DESCRIPTION

Figure 1:
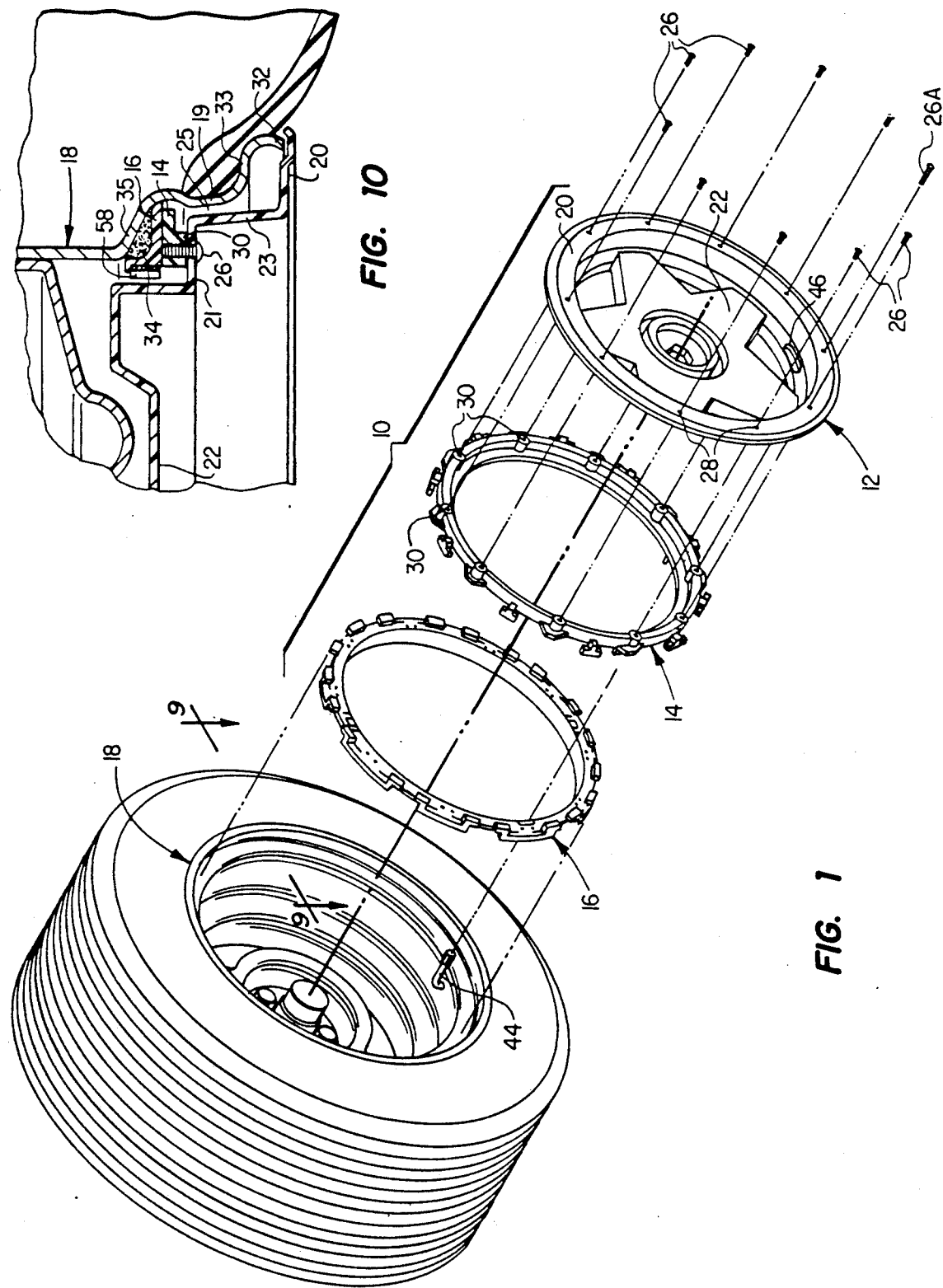
FIG. 1 is an exploded perspective view of an automotive wheel and the custom wheel-simulating wheel cover apparatus that embodies principles of the present invention.

Referring initially to FIG. 1, it is seen that simulated custom wheel apparatus 10, in a preferred embodiment thereof, consists essentially of three main components: a wheel cover member 12; a first ring member 14 (also referred to as the "retaining ring"); and a second ring member 16 (also referred to as the "bonding ring"). When assembled as illustrated and as described herein, simulated custom wheel apparatus 10 allows the user thereof to affordably and accurately simulate the appearance of an expensive custom wheel, utilizing a relatively inexpensive, ordinary automotive wheel 18.

Wheel cover member 12 is preferably molded or otherwise formed from a suitably rigid, impact resistant clear plastic. Wheel cover member 12 may be painted or molded in a plastic material of the desired color, or it may be formed from a metallic material and left completely or partially unpainted.

In the preferred embodiment shown, wheel cover member 12 includes a circular outer rim portion 20, integrally formed with contoured body portion 22. Radially and axially inward from outer rim portion 20 is inner rim portion 21, which is separated from outer rim portion 20 by radially facing annular wall 23. As illustrated, inner rim portion 21 generally defines the annular perimeter of contoured body portion 22.

The configuration and overall dimensions of the front side of wheel cover member 12 are substantially identical to the corresponding configuration and dimensions of a typical custom automotive wheel. The high degree of accuracy with which wheel cover member 12 duplicates the appearance of an actual custom wheel is due, in part, to the uniquely narrow width of outer rim portion 20, as compared to conventional wheel covers. The unique placement and operation of retention system 24 allows space 25, disposed between wall 23 and axially extending section 19 of wheel 18, to be minimized. Those skilled in the art will readily appreciate that the reduction in radial width of space 25 allows for a maximum diameter for body portion 22 and a minimum thickness for outer rim portion 20, thereby enabling wheel cover member 12 to quite accurately simulate a custom automotive wheel. It is expected that the actual configuration of wheel cover member 12 may be selected to simulate any number of custom wheel designs without departing from the scope of this invention.

Figure 2:
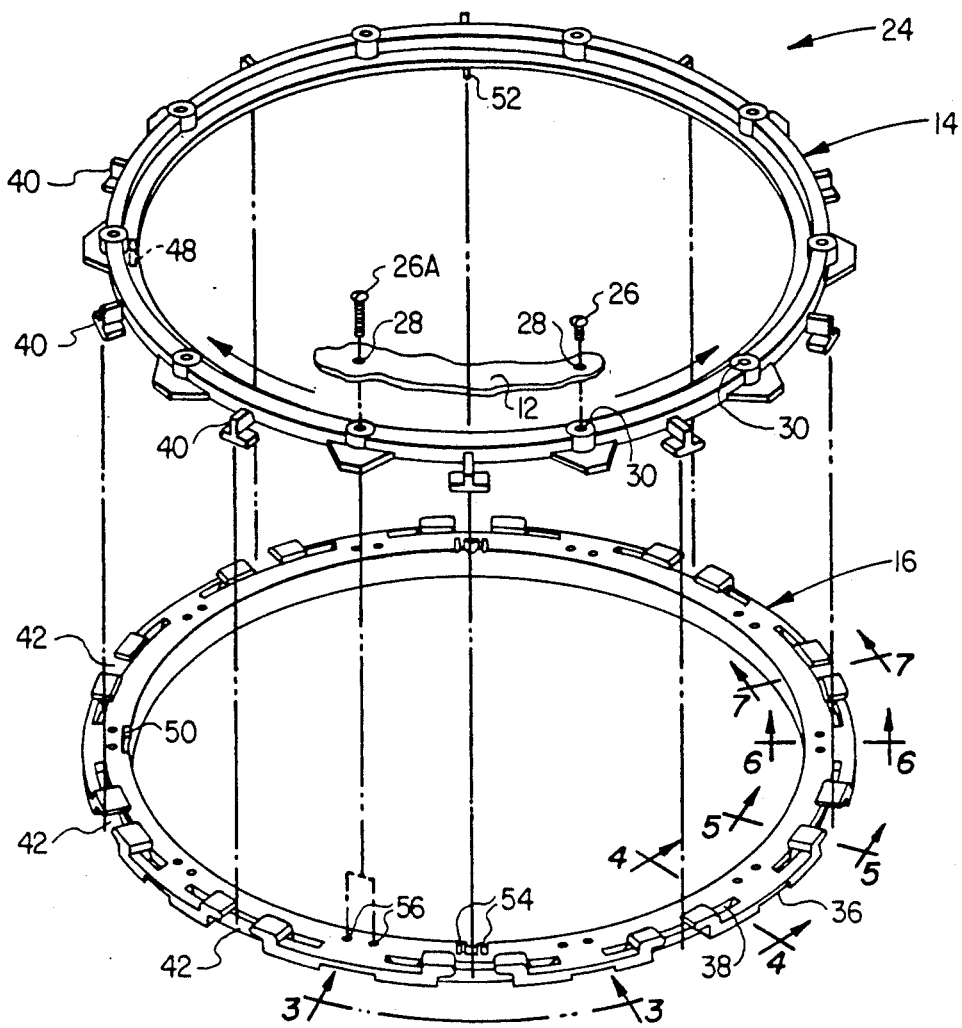
FIG. 2 is an enlarged scale exploded perspective view of the retention system for the wheel cover apparatus for the present invention.

First ring 14 and second ring 16 generally constitute the unique retention system of this invention, designated generally by the numeral 24 in FIG. 2. First ring 14 is removably secured to outer rim portion 20 of wheel cover member 12 by screws 26. As best illustrated in FIG. 1, screws 26 pass through holes 28 in outer rim portion 20, and threadingly engage threaded bosses 30 which are integrally formed around the circumference of first ring 14. Screws 26 are generally of suitable length to engage, but not extend completely through, threaded bosses 30. It is contemplated, however, that at least one screw, designated locking screw 26a, be substantially longer than the remaining screws 26, thereby providing a locking feature described in more detail below.

Preferably, second ring 16 is permanently bonded to wheel 18, substantially adjacent and radially inwardly of outer peripheral edge 32, by adhesive 34. In order to increase the strength of the bond effected by adhesive 34, bonding ring 16 preferably includes recessed portions 36 and slots 38 into which adhesive 34 flows prior to final curing. In order to keep both weight and cost to a minimum, it is preferred that first ring 14 and second ring 16 be molded from suitable plastic material. Specifically, nylon has been selected for first ring 14, due to its superior threading capabilities, while a suitable polycarbonate has been chosen for second ring 16 due to its superior bonding characteristics. It is contemplated, however, that many other materials may be equally well suited for the purposes described herein, particularly light weight metals. In the event that second ring 16 is made from metal, it is further contemplated that second ring 16 may be welded to wheel 18, thus eliminating the need for adhesive 34.

Figure 3:
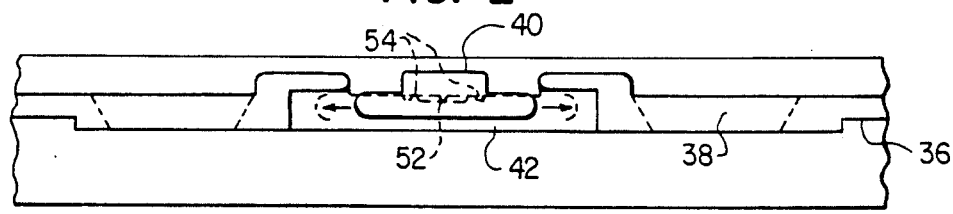
FIG. 3 is an enlarged scale elevational view, partially in phantom, of a circumferential edge portion of the retention system, taken generally along line 3—3 of FIG. 2, showing the retention system in a partially assembled state.
Figure 4:
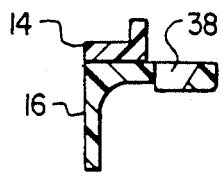
FIG. 4 is an enlarged scale cross-sectional view of the retention system taken along line 4—4 of FIG. 2, with the retention system in an assembled state.
Figure 5:
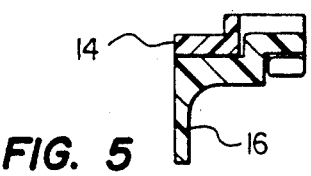
FIG. 5 is an enlarged scale cross-sectional view of the retention system taken along line 5—5 of FIG. 2, with the retention system in an assembled state.
Figure 6:
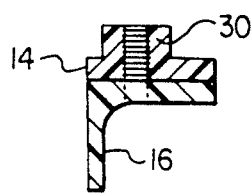
FIG. 6 is an enlarged scale cross-sectional view of the retention system taken along line 6—6 of FIG. 2, with the retention system in an assembled state.
Figure 7:
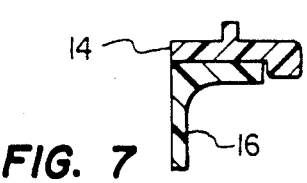
FIG. 7 is an enlarged scale cross-sectional view of the retention system taken along line 7—7 of FIG. 2, with the retention system in an assembled state.
Figure 8:
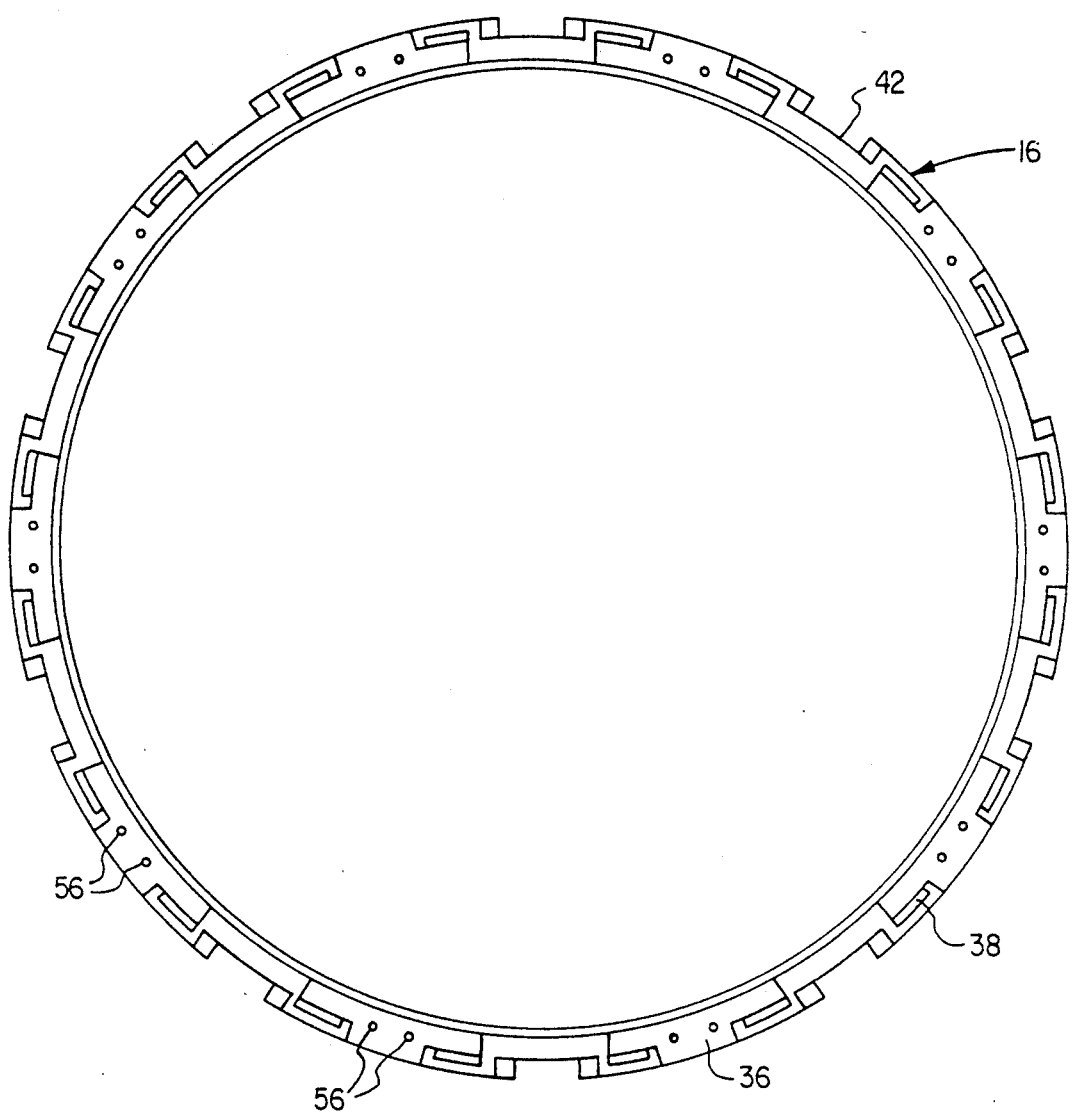
FIG. 8 is an enlarged scale rear side elevational view of the second ring member of the retention system.

Referring now to FIGS. 2 and 3, it is seen that first ring 14 includes a plurality of T-shaped lugs 40 extending therefrom, while second ring 16 includes an equal number of receptacles 42. The configuration of lugs 40 and receptacles 42 is such that lugs 40 may be inserted into receptacles 42, and engaged therewith in response to either clockwise or counter-clockwise rotation of first ring 14. Due to the unique, interlocking configuration of lugs 40 and receptacles 42, wheel cover member 12, with first ring 14 secured thereto, is easily securable to wheel 18 simply by aligning lugs 40 with receptacles 42, pressing wheel cover member 12 axially so that lugs 40 are inserted into receptacles 42, and slightly rotating wheel cover member 12 in either direction. Wheel cover member 12 is easily removable by equivalent counter-rotation to disengage lugs 40 from receptacles 42.

For certain configurations of wheel cover member 12, such as the embodiment illustrated herein, it is important that, upon securing wheel cover member 12 to wheel 18, valve stem 44 is accessible through opening 46. Therefore, in order to insure proper alignment of wheel cover member 12 with wheel 18, suitable alignment means may be provided with retention system 24. Accordingly, as shown in FIG. 2, retention system 24 is provided with alignment post 48 extending axially from first ring 14, and cavity 50 in second ring 16. In order to properly join first ring 14 to second ring 16 as described herein, alignment post 48 must be properly aligned with cavity 50. Therefore, during initial assembly of first ring 14 to wheel cover member 12, and second ring 16 to wheel 18, it is important that alignment post 48 be properly aligned with cavity 50 concurrently with valve stem 44 being accessible through opening 46.

In order to provide a positive "click" to denote that wheel cover member is properly in place with lugs 40 engaging receptacles 42, retention system 24 includes buttons 52 and detents 54, as shown in FIGS. 1, 2 and 3. (In FIGS. 1 and 2, buttons 52 are greatly exaggerated since they would not ordinarily be visible from the angle illustrated). Upon rotation of wheel cover member 12 in either the clockwise or counter-clockwise direction, buttons 52 snap over and are retained in position by detents 54. Thus, wheel cover member 12 is essentially "snapped" into position due to the interaction of buttons 52 with detents 54, while the frictional engagement of buttons 52 and detents 54 provides a degree of protection against inadvertent counter-rotation and subsequent removal of wheel cover member 12 from wheel 18.

If a higher degree of protection against inadvertent counter-rotation, or even theft, of wheel cover member 12 is desired, simulated custom wheel apparatus 10 may also include one or more locking screws 26a. As best illustrated in FIG. 2, second ring 16 includes a series of locking holes 56 formed therein, with locking holes 56 being carefully positioned so that they are in alignment with threaded bosses 30 upon the attachment of first ring 14 to second ring 16. Since locking screw 26a is longer than the depth of threaded bosses 30, it is necessary to partially unscrew locking screw 26a prior to assembly of wheel cover member 12 to second ring 16. Once wheel cover member 12 is properly snapped into place, locking screw 26a may then be fully inserted, so that its leading end passes through one of locking holes 56, thereby preventing the counter-rotation of wheel cover member 12 and first ring 14. After wheel cover member 12 has been snapped into place and locking screw 26a fully inserted, the outward appearance of locking screw 26a is virtually indistinguishable from the remainder of screws 26, so that a thief would be unable to tell which screw must be loosened in order to remove wheel cover member 12. As an additional degree of theft protection, the user of simulated custom wheel apparatus 10 could also employ a plurality of locking screws 26a, with only the user knowing the location of such screws.

Figure 9:
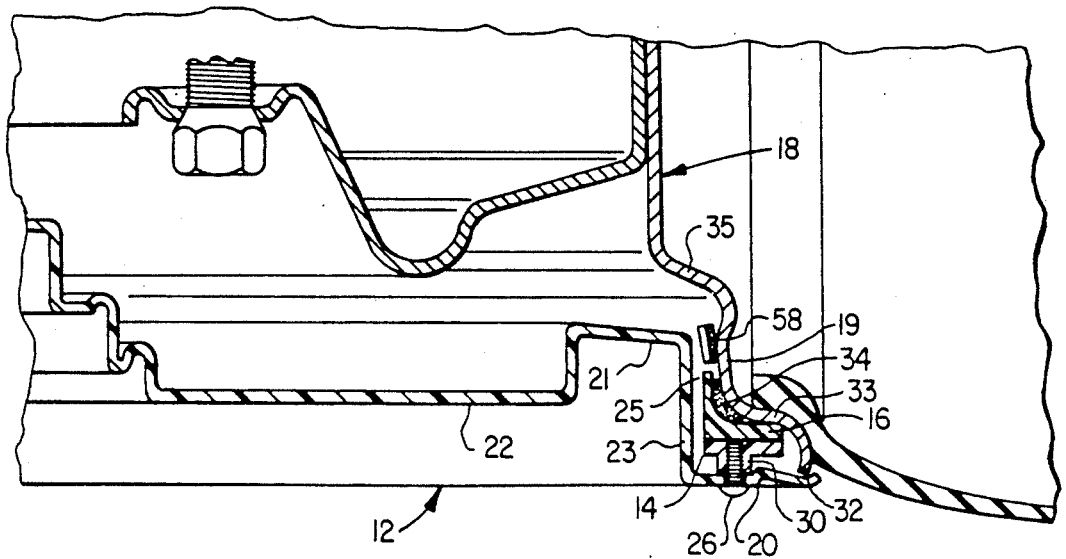
FIG. 9 is an enlarged scale fragmentary cross-sectional view through the automotive view and preferred wheel cover apparatus, taken along line 9—9 of FIG. 1, with the wheel cover apparatus shown in its assembled state.

FIG. 9 illustrates the inter-relationship of wheel cover member 12, first ring 14, second ring 16, and wheel 18 when these components are in their operative, fully assembled position. Another advantage of the present invention is that it allows the use of tape-type wheel weights 58 for balancing purposes. With most conventional wheel covers, space 25 is occupied by the conventional retention system. The unique placement of retention system 24, however, allows the convenient placement of weights 58 within space 25. Retention system 24 does not interfere with wheel weights 58 in their preferred position in space 25, as would many conventional retention systems, thus providing for accurate balancing of wheel 18 incorporating simulated custom wheel apparatus 10.

FIG. 10 illustrates an alternative embodiment for retention system 24, which is essentially identical to the preferred embodiment discussed above except for its radial placement. As illustrated, it is contemplated that second ring member 16 may be bonded or otherwise secured to inner annular ridge 35, instead of outer annular ridge 33 as preferred. Similarly, first ring 14 may be secured to inner rim portion 21, rather than outer rim portion 20, for mating with second ring 16 in its alternative position. Those skilled in the art will appreciate that, with this embodiment, it may be more convenient to secure wheel weight 58 directly to second ring 16 as shown. It will also be clear to those skilled in the art that the alternative embodiment will be preferable when certain types of custom wheels are to be simulated, particularly those custom wheels having screws disposed in the area of inner rim portion 21 rather than along outer rim portion 20.

As mentioned above, it is preferred that wheel cover member 12, first ring 14, and second ring 16 be formed from plastic materials suitable for the purpose. In addition to keeping the cost and weight of the invention to acceptable levels, plastic materials also provide a higher degree of flexibility for this invention than exhibited by conventional wheel covers, particularly in the construction of the retention system. Since the present invention includes a relatively flexible, plastic retention system, the entire apparatus has the ability to bend and flex with the wheel under extreme circumstances, such as unusually hard cornering or when encountering a large bump or hole in the road surface. The present invention is able to remain intact under circumstances which would cause a conventional wheel cover to be severely damaged or thrown off and possibly lost.

Although the preferred embodiment of this invention has been described in detail, as well as certain alternative embodiments, it should be understood that various other changes, substitutions and alterations can be made therein without departing from the spirit and scope of the invention as defined by the appended claims.

What is claimed is:

1. Decorative wheel cover apparatus, removably securable in an operative position over the outer side of an ordinary automotive wheel having an outer peripheral edge portion, for relatively inexpensively simulating the appearance of a custom wheel having an outwardly facing circular rim periphery, said decorative wheel cover apparatus comprising:

a rigid wheel cover member having opposite back and front sides, with a contoured body portion and a circular outer rim portion configured such that said front side of said wheel cover member accurately simulates the outward appearance and configuration of the custom wheel to be simulated;

mating retention means for removably securing said wheel cover member to said automotive wheel, said retention means comprising:

a first retaining portion securable along said back side of said circular outer rim portion of said wheel cover member; and a mating portion securable to said automotive wheel immediately radially inwardly of said outer peripheral edge portion of said wheel and positioned to be directly behind said first retaining portion when said wheel cover is placed in its operative position on said automotive wheel, said first retaining portion and said mating portion having interlocking engagement means for releasable engagement with one another when said mating portion is secured to the outer peripheral edge of said wheel and mated with the retaining portion having the wheel cover secured thereto and located in its operative position, said retaining and mating portions being engageable and disengageable in response to rotation of said wheel cover member relative to said automotive wheel; whereby said wheel cover member is removable securable in its operative position over the outer side of said automotive wheel.

2. The decorative wheel cover apparatus of claim 1 further comprising:

locking means for selectively preventing the disengagement of said first portion of said retention means from said mating portion thereof.

3. The decorative wheel cover apparatus of claim 1 wherein:

said first retaining portion of said retention means comprises a first ring member having an outer periphery, said first ring member being formed from a generally rigid material and being adapted for attachment to said back side of said circular outer rim portion of said wheel cover member by suitable fastening means; and said first ring member has a plurality of lugs integrally formed therewith, said lugs extending radially outwardly from said outer periphery and being disposed in a spaced apart relationship at substantially equivalent intervals along said outer periphery of said first ring member;

said lugs being configured for releasable engagement with said mating portion of said retention means.

4. The decorative wheel cover apparatus of claim 3 wherein:

said fastening means comprise a plurality of screws operatively disposed through suitable holes in said circular outer rim portion of said wheel cover member; and said first ring member includes a plurality of threaded bosses formed therein for receiving and engaging said screws.

5. The decorative wheel cover apparatus of claim 1 wherein:

said mating portion of said retention means comprises a second ring member having an outer periphery, said second ring member being formed from a generally rigid material and being adapted for attachment by suitable fastening means to said automotive wheel, radially inwardly of said outer peripheral edge portion thereof; and said second ring member has a plurality of receptacles integrally formed therewith, said receptacles facing axially outwardly from said outer periphery and being disposed in a spaced apart relationship at substantially equivalent intervals along said outer periphery of said second ring member;

said receptacles being configured for releasable engagement with said first retaining portion of said retention means.

6. The decorative wheel cover apparatus of claim 5 wherein:

said fastening means comprise an adhesive material operatively disposed between said second ring member and said automotive wheel.

7. The decorative wheel cover apparatus of claim 1 wherein:

said first retaining portion of said retention means comprises a first ring member securable to said back side of said circular outer rim portion of said wheel cover member, said first ring member having a plurality of lugs integrally formed therewith and extending therefrom; and said mating portion of said retention means comprises a second ring member securable to said automotive wheel radially inwardly of said outer peripheral edge portion thereof, said second ring member having a plurality of receptacles integrally formed therewith; and and lugs are adapted for releasable engagement with said receptacles.

8. The decorative wheel cover apparatus of claim 7 wherein:

said first ring member is secured to said back side of said circular outer rim portion of said wheel cover member by means of a plurality of screws operatively disposed through suitable holes formed in said wheel cover member;

said first ring member has a plurality of threaded bosses formed therein for receiving and engaging said screws, at least one of said screws being of suitable length to extend completely through said bosses;

said first ring member is engageable with said mating ring member by inserting said lugs into said receptacles and rotating said wheel cover member in either a clockwise or counter-clockwise direction; and and mating ring member includes a plurality of locking holes formed therein, at least a portion of said locking holes being aligned with said threaded bosses upon engagement of said lugs with said receptacles and rotation of said wheel cover member to its operative position; whereby said at least one screw is operative to engage at least one of said locking holes, thereby providing a locking device to prevent unintended counter-rotation of said wheel cover member.

9. The decorative wheel cover apparatus of claim 7 wherein:

said first and second ring members include alignment means for preventing the engagement of said lugs with said receptacles unless said wheel cover member is properly aligned with said automotive wheel.

10. The decorative wheel cover apparatus of claim 9 wherein said alignment means comprise:

an axially extending post member, integrally formed with said first ring member, said post member extending inwardly from said first ring member toward said second ring member; and a cavity, formed in said second ring member, said cavity being suitable to receive said post member;

said post member being operative to prevent at least a portion of said lugs from engaging said receptacles, unless said first and second ring members are properly aligned, thereby allowing said cavity to receive said post member.

11. A retention system for removably securing, in assembly, a decorative wheel cover having annular inner and outer rim portions to an automotive wheel having an outer peripheral edge portion, said outer rim portion of said wheel cover being disposed axially and radially outwardly from said inner rim portion, said retention system comprising:

a first ring member securable to said decorative wheel cover in a concentric relationship and being mateable, in assembly, with a second ring member, one of said first or second ring members having a plurality of spaced part lugs extending therefrom; and a second ring member being securable to said wheel radially and axially inwardly of said outer peripheral edge portion of said wheel, said second ring member being mateable, in assembly, with said first ring member, the other of said first or said second ring members having a plurality of spaced apart receptacles formed therein, said receptacles on one of said ring members and said lugs on the other of said ring members being interengageable when said ring members are mated and said first ring member is rotated with respect to said second ring member, said lugs and receptacles being adapted for releasable engagement with each other, whereby said first ring member is removable from said second ring member upon disengagement of said lugs with said receptacles.

12. The retention system means of claim 11 wherein:

said second ring member is permanently secured to said wheel by means of an adhesive material.

13. The retention system of claim 11 wherein:

said wheel cover member has a plurality of holes formed therethrough; and said first ring member includes a plurality of threaded bosses formed therein and an equal number of comparably threaded screws, whereby said decorative wheel cover is removably securable to said first ring by means of said screws being inserted through said holes in said wheel cover and threadingly engaging said bosses.

14. The retention system of claim 13 wherein:

said second ring member includes a plurality of holes formed therein, at least some of said holes being aligned with said threaded bosses upon securing said first ring member to said second ring member; and at least one of said screws is of suitable length to extend through its corresponding threaded boss and said hole aligned therewith, thereby providing locking means for preventing the rotation and subsequent removal of said first ring member from said second ring member.

15. The retention system of claim 11 wherein:

said first ring member is securable to said outer rim portion of said decorative wheel cover.

16. The retention system of claim 11 wherein:

said first ring member is securable to said inner rim portion of said decorative wheel cover.

17. A retention system for removably securing a decorative wheel cover having annular inner and outer rim portions to an ordinary automotive wheel having an outer peripheral edge portion, said retention system comprising:

first engaging means disposed along one of said inner of said outer rim portions of said decorative wheel cover; and second engaging means disposed radially inwardly of said outer peripheral edge portion of said automotive wheel;

said first and second engaging means being adapted for releasable engagement with each other;

said first and second engagement means being cooperative in a manner permitting said engagement of said first and second engaging means to be effected by holding said wheel cover against said automotive wheel, thereby placing said first engaging means in contact with said second engaging means, and rotating said wheel cover in either the clockwise or counter-clockwise direction.

18. The retention system of claim 17 further comprising:

locking means for selectively preventing the counter-rotation of said wheel cover.

19. The retention system of claim 17, wherein:
said first engaging means comprise a plurality of lugs; and said second engaging means comprise a plurality of receptacles, said receptacles being adapted to receive and releasably retain said lugs.

20. Decorative wheel cover apparatus, removably securable in an operative position over the outer side of an ordinary automotive wheel, for relatively inexpensively simulating the appearance of a custom wheel having an outwardly facing circular periphery, said automotive wheel having an outer peripheral edge portion, a first annular ridge disposed radially and axially inwardly of said outer peripheral edge portion, and a second annular ridge disposed radially and axially inwardly of said first annular ridge, said decorative wheel cover apparatus comprising:

a rigid wheel cover member having opposite back and front side, said front side accurately simulating the outward appearance and configuration of the custom wheel to simulated, said wheel cover member having a circular outer rim portion and a contoured body portion, said contoured body portion having an annular perimeter disposed radially and axially inwardly of said circular outer rim portion; and retention means for removably securing said wheel cover member to said automotive wheel, said retention means comprising:

a first portion securable along said back side of said annular perimeter of said contoured body portion of said wheel cover member; and a second potion securable to said second annular ridge of said automotive wheel and positioned to be directly behind said first portion when said wheel cover is in its operative position on said automotive wheel, said first and second portions being configured for releasable engagement with one another when said first portion is placed directly in front of said second potion and rotated with respect to said second portion, to position the wheel cover in said operative position when said second portion of the retention means is secured to the second annular ridge of said wheel and said wheel cover is secured to the first portion of the retention means whereby upon engagement of said first potion of said retention means with said second portion; said wheel cover member is secured in its operative position over the outer side of said automotive wheel.

21. The decorative wheel cover apparatus of claim 20 further comprising:

locking means for selectively preventing the disengagement of said first portion of said retention means from said second portion thereof.

22. The decorative wheel cover apparatus of claim 20 wherein:

said first portion of said retention means comprises a first ring member having an outer periphery, said first ring member being formed from a generally rigid material and being adapted for attachment to said back side of said annular perimeter portion of said contoured body portion of said wheel cover member by suitable fastening means; and said first ring member has a plurality of lugs integrally formed therewith, said lugs extending radially outwardly from said outer periphery and being disposed in a spaced apart relationship at substantially equivalent intervals along said outer periphery of said first ring member;

said lugs being configured for releasable engagement with said second portion of said retention means.

23. The decorative wheel cover apparatus of claim 22 wherein:

said fastening means comprise a plurality of screws operatively disposed through suitable holes in said annular perimeter portion of said contoured body portion of said wheel cover member; and said first ring member includes a plurality of threaded bosses formed therein for receiving and engaging said screws.

24. The decorative wheel cover apparatus of claim 20 wherein:

said second portion of said retention means comprises a second ring member having an outer periphery, said second ring member being formed from a generally rigid material and being adapted for attachment by suitable fastening means to said second annular ridge of said automotive wheel; and said second ring member has a plurality of receptacles integrally formed therewith, said receptacles facing axially outwardly from said outer periphery and being disposed in a spaced apart relationship at substantially equivalent intervals along said outer periphery of said second ring member;

said receptacles being configured for releasable engagement with said first portion of said retention means.

25. The decorative wheel cover apparatus of claim 24 wherein:

said fastening means comprise an adhesive material operatively disposed between said second ring member and said second annular ridge of said automotive wheel.

26. The decorative wheel cover apparatus of claim 21 wherein:

said first portion of said retention means comprises a first ring member secured to said back side of said annular perimeter portion of said contoured body portion of said wheel cover member, said first ring member having a plurality of lugs integrally formed therewith and extending therefrom; and said second portion of said retention means comprises a second ring member secured to said second annular ridge portion of said automotive wheel, said second ring member having a plurality of receptacles integrally formed therewith;

said lugs being configured for releasable engagement with said receptacles.

27. The decorative wheel cover apparatus of claim 26 wherein:

said first ring member is secured to said back side of said annular perimeter portion of said contoured body portion of said wheel cover member by means of a plurality of screws operatively disposed through suitable holes formed in said annular perimeter portion;

said first ring member has a plurality of threaded bosses formed therein for receiving and engaging said screws, at least one of said screws being of suitable length to extend completely through said bosses;

said first ring member is engageable with said second ring member by inserting said lugs into said receptacles and rotating said wheel cover member in either a clockwise or counter-clockwise direction; and said second ring member includes a plurality of locking holes formed therein, at least a portion of said locking holes being aligned with said threaded bosses upon engagement of said lugs with said receptacles and rotation of said wheel cover member to its operative position; whereby said at least one screw is operative to engage at least one of said locking holes, thereby providing a locking device to prevent unintended counter rotation of said wheel cover member.

28. The decorative wheel cover apparatus of claim 26 wherein:

said first and second ring members include alignment means for preventing the engagement of said lugs with said receptacles unless said wheel cover member is properly aligned with said automotive wheel.

29. The decorative wheel cover apparatus of claim 28 wherein said alignment means comprise:

an axially extending post member, integrally formed with said first ring member, said post member extending inwardly from said first ring member towards said second ring member; and a cavity, formed in said second ring member, said cavity being suitable to receive said post member;

said post member being operative to prevent at least a portion of said lugs from engaging said receptacles, unless said first and second ring members are properly aligned, thereby allowing said cavity to receive said post member.

* * * * *

UNITED STATES PATENT AND TRADEMARK OFFICE
CERTIFICATE OF CORRECTION

PATENT NO. : 5,046,784

DATED : September 10, 1991

INVENTOR(S) : George A. Carter, III

It is certified that error appears in the above-identified patent and that said Letters Patent is hereby corrected as shown below:

In column 8, line 10, delete "removable" and add --removably--.

In column 10, line 60, delete "of" (1st Occur) and add --or--.

In column 11, line 30, delete "and front side" and add --and front sides--.

In column 11, line 44, delete "potion" and add --portion--.

In column 11, line 58, delete "potion" and add --portion--.

In column 12, line 48, delete "21" and add --20--.

Signed and Sealed this

Second Day of March, 1993

Attest:

STEPHEN G. KUNIN

*Attesting Officer*     Acting Commissioner of Patents and Trademarks